(12) United States Patent
Epstein

(10) Patent No.: US 6,478,229 B1
(45) Date of Patent: Nov. 12, 2002

(54) PACKAGING TAPE WITH RADIO FREQUENCY IDENTIFICATION TECHNOLOGY

(76) Inventor: Harvey Epstein, 21 Barnstable Rd., Newton, MA (US) 02465

( * ) Notice: Subject to any disclaimer, the term of this patent is extended or adjusted under 35 U.S.C. 154(b) by 0 days.

(21) Appl. No.: 09/524,937

(22) Filed: Mar. 14, 2000

(51) Int. Cl.⁷ ............................................. G06K 19/06
(52) U.S. Cl. ........................................ 235/492; 342/51
(58) Field of Search .................... 235/492; 342/51; 428/204; 340/572.7

(56) References Cited

U.S. PATENT DOCUMENTS

| | | | |
|---|---|---|---|
| 4,562,102 A | * 12/1985 | Rabuse et al. ................ 428/43 |
| 4,576,854 A | * 3/1986 | Kurahashi .................... 428/204 |
| 5,130,783 A | 7/1992 | McLellan ..................... 357/74 |
| 5,497,140 A | * 3/1996 | Tuttle ......................... 342/51 |
| 5,559,370 A | 9/1996 | Berney ........................ 257/679 |
| 5,719,586 A | 2/1998 | Tuttle ......................... 343/726 |
| 5,725,487 A | * 3/1998 | Freeman et al. .............. 602/8 |
| 5,776,278 A | * 7/1998 | Tuttle et al. ................. 156/213 |
| 6,018,298 A | 1/2000 | Endo et al. ................. 340/572.5 |
| 6,018,299 A | 1/2000 | Eberhardt ................... 340/572.7 |
| 6,100,804 A | * 8/2000 | Brady et al. ................ 340/572.7 |

* cited by examiner

Primary Examiner—Karl D. Frech
Assistant Examiner—Lisa M. Caputo
(74) Attorney, Agent, or Firm—Pandiscio & Pandiscio

(57) ABSTRACT

An adhesive packaging tape in roll form is characterized by a plurality of encapsulated RFID transponders that are spaced from one another along the length of the tape. The tape may be of the fiber-reinforced type or may not be of the reinforced type.

2 Claims, 1 Drawing Sheet

PACKAGING TAPE WITH RADIO FREQUENCY IDENTIFICATION TECHNOLOGY

Figure 1:
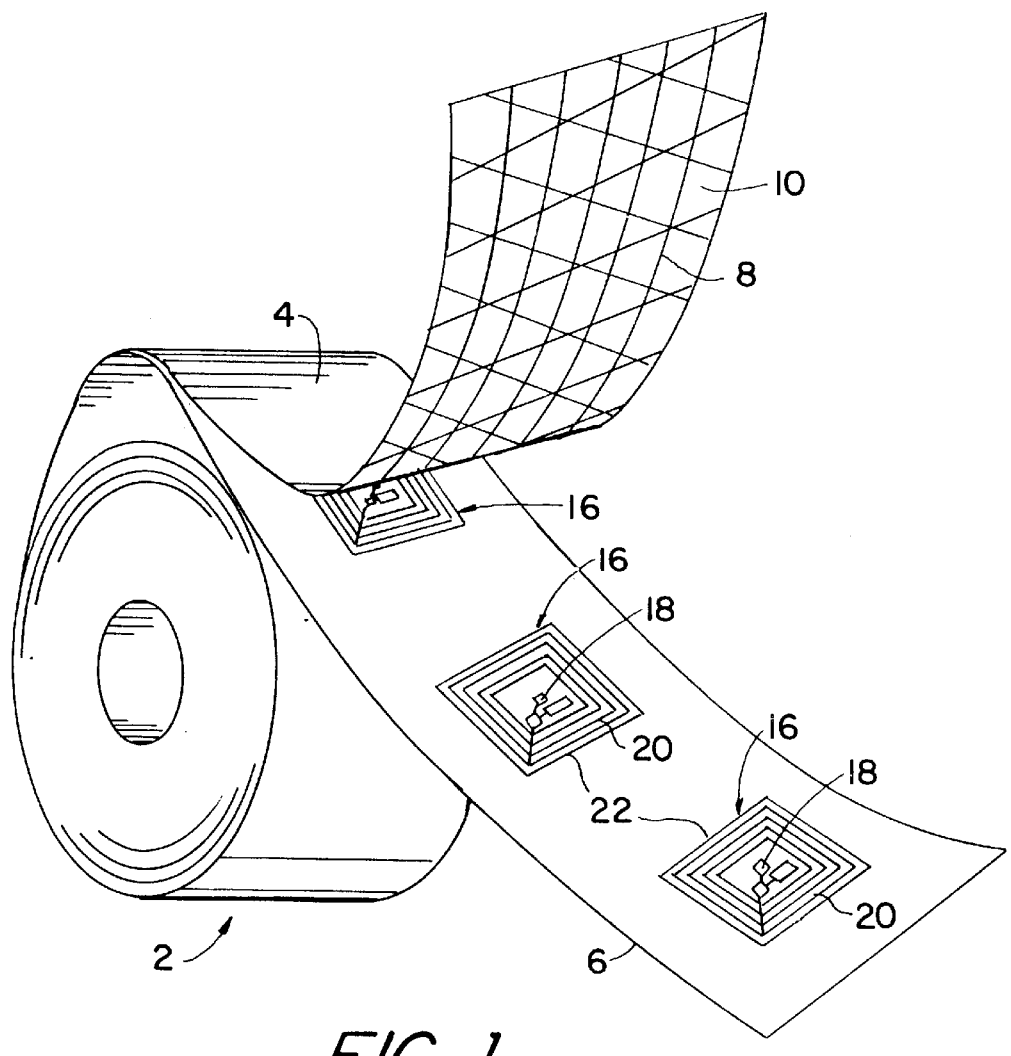

This invention relates to packaging tapes and more particularly to packaging tape that permits accurate identification and tracking of packages.

BACKGROUND OF THE INVENTION

Various technologies have been developed for identifying and tracking objects. The most common involves application of identifying bar codes to objects and optically scanning those codes to identify the objects or certain other relevant coded characteristics, e.g., size, model, price, etc. A more recent development is radio frequency identification technology, commonly known as RFID technology. RFID devices, commonly called RFID tags, are thin transponders (transceivers) that include an integrated circuit chip having RF (radio frequency) circuits, control logic and memory, plus an antenna, all mounted on a supporting substrate. RFID devices are either of the active type or passive type. The active type include a battery for powering the transceiver. The passive type has no battery and derives its energy from the RF signal used to interrogate it. The RFID transponder operates to receive, store and transmit object-identifying data to and from the memory within the chip. The device functions in response to coded RF signals received from a base station. Typically it reflects the incident RF carrier back to the base station, and information stored in the device is transmitted back to the interrogating base station by modulating the reflected signal according to the programmed information protocol.

Recent developments have produced thin RFID tags on flexible organic substrates, with the overall thickness of the tags being of the order of a fraction of a millimeter, typically about 1.5 mils thick. Various materials have been used as the organic substrate of commercial RFID tags, including but not limited to thin flexible films of a polyester such as Mylar® or a polyimide such as Kapton®. The antenna may comprise pre-formed wires that are attached to the substrate, but more commonly it is a thin film element, usually consisting of 25 to 25 micron thick copper lines formed by plating copper onto the flexible organic substrate or by etching in the case where the substrate is a copper/organic material laminate. Further information regarding the manufacture and use of RFID transponders is provided by U.S. Pat. No. 5,497,140, issued Mar. 5, 1996 to J. R. Tuttle; U.S. Pat. No. 5,528,222, issued Jun. 18, 1996 to P. A. Moskowitz et al.; U.S. Pat. No. 5,566,441, issued Oct. 22, 1996 to M. J. C. Marsh et al.; U.S. Pat. No. 5,661,473, issued Aug. 26, 1997 to J. P. Paschal; U.S. Pat. No. 5,682,143, issued Oct. 28, 1997 to M. J. Brady et al.; U.S. Pat. No. 5,995,951, issued Sep. 21, 1999, and U.S. Pat. No. 6,018,299, issued Jan. 25, 2000 to N. H. Eberhardt, The greatest disadvantage of bar codes is that they are not dynamic carriers of information. With bar codes the stored information is static. Consequently information stored in bar codes on an object cannot be updated as it travels, for example, from a shipper to a receiver. In contrast, RFID tags offer the capability of updating recorded information at any time and in real time. RFID transponders are of particular value to industries that need to quickly and accurately track and manage very large numbers of objects. The passive type of RFID tag is particularly valuable in relation to inventory management and control because it offers a long life data storage and retrieval capability, since it draws its energy and transfers information in the form of low power radio waves resulting from operation of the read/write module of a base station.

OBJECTS AND SUMMARY OF THE INVENTION

The primary object of the invention is to facilitate and extend the use of RFID transponders as a means of identifying and tracking packages, whereby to improve inventory management and control of packages while in transit from a shipper to a receiver.

A more specific object is to provide a novel means of attaching RFID tags to packages or other objects.

These objects are achieved by incorporating a plurality of RFID transponders in a packaging tape that is supplied in roll form to users. The tape may be of a reinforced or non-reinforced type. Other features and advantages of the invention are disclosed in the following detailed description which is to be considered together with the accompanying drawings.

THE DRAWINGS

Figure 2:
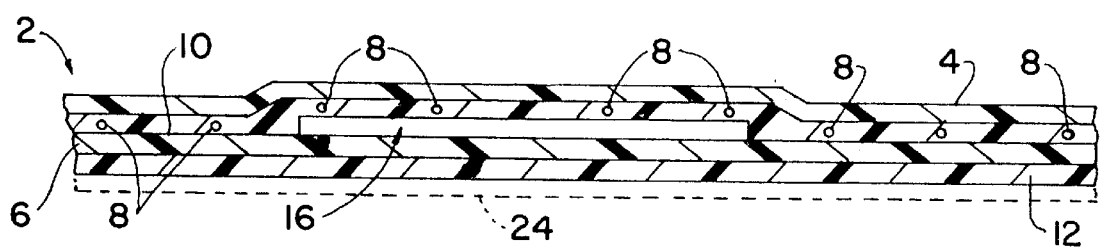

FIG. 1 is a perspective view illustrating a roll of a laminated multi-layer packaging tape incorporating a plurality of thin RFID transponders according to the invention; and FIG. 2 is a schematic cross-sectional view on an enlarged scale of a section of the tape shown in FIG. 1. This drawing is not intended to accurately portraying the relative thicknesses of the several layers of the tape but merely to identify them and show their relative locations.

SPECIFIC DESCRIPTION OF THE INVENTION

Referring first to FIG. 1, there is shown a roll 2 of a laminated fiber-reinforced packaging tape that incorporates RFID transponders according to the present invention. Preferably, but not necessarily, the tape is made according to the method and apparatus disclosed in U.S. Pat. No. 3,829,339, issued Aug. 13, 1974 to L. A. Pinette for Method And Apparatus For Forming Fine Mesh Nonwoven Web. The information relating to packaging tapes disclosed by said U.S. Pat. No. 3,829,339 is incorporated herein by reference.

More specifically and with further reference to FIG. 2, the illustrated tape comprises an upper or first layer in the form of a paper ribbon or web 4, a lower or second layer 6 also in the form of a paper ribbon or web, and a non-woven reinforcing mesh or scrim consisting of a plurality of fibers or yarns 8, all of which are bonded together by an adhesive layer 10 that fills the spaces between the fibers. Additionally the underside of layer 6 is coated with a suitable water-activatable adhesive 12 for attaching the tape to a package or other article. Preferably the mesh or scrim 8 is made of fiberglass yarn, but a mesh or scrim made of some other material may be used instead. To the extent just described, the tape 2 illustrates prior art.

According to this invention, a plurality of RFID transponders 16 are sandwiched between the upper and lower layers of the tape. The form of the RFID transponder is not critical to the invention, so long as it is flexible and thin. While active RFID transponders may be used, it is preferred for a number of reasons to employ passive transponders. The transponders 16 include an integrated circuit chip 18 and an antenna coil 20 mounted on a thin organic polymer substrate 22. Preferably but not necessarily, the substrate is a transparent film of a suitable polyester such as a Mylar® or a polyimide such as Kapton®, but it may me some other organic polymer material in sheet or film form so long as it is flexible and thin. By way of example but not limitation, it is preferred that the transponders be Texas Instruments Tag-It™ Foil Tags which are identified by Product No. R1-101-0110 and have a polyethylene-therephthalate substrate, a thickness less than 0.38 mm, a generally rectangular antenna coil as shown at 20 that measures 45 mm×45 mm, and an operating frequency of 13.56 Mhz. The transponders 16 are positioned in line along the length of the tape according to a predetermined spacing pattern.

The transponders are inserted into the tape 2 as the latter is being manufactured. A known RFID manufacturing practice is to produce a plurality of RFID tags on a common flexible substrate or carrier that is in the form of a tape which subsequently is wound into a roll or a reel. A further known practice is to sever that tape to remove individual tags for application to objects to be identified. The Texas Instruments Tag-It™ Foil Tags are sold commercially as a continuous tape wound on a reel with the suggestion that individual tags be separated from the roll and applied to objects to be identified.

The manufacture of the RFID-carrying laminated tape shown in FIG. 1 involves inserting individual transponders between the tape layers before those layers are laminated together. In the case where the transponders are formed on an endless carrier tape or web, like the Texas Instruments Tag-It™ Foil Tags, the transponders are separated one from another by severing the carrier web between transponders, and then mechanical transfer means (not shown) are used to pick up the individual transponders and deposit them one at a time onto one of the webs that is used to form the tape, with that selected web, e.g., bottom web 6, acting as the sole support for the transponders until the several layers or webs making up the tape are laminated together. Once the packaging tape has been laminated with the transponders encapsulated therein, the tape may be wound into a roll for dispensing later for package-sealing purposes. It is contemplated that the spacing of the RFID tags along the packaging tape will be such that only a single tag will be applied to a carton or other package to which the tape is secured.

A preferred form of packaging tape embodying the invention consists of inner and outer paper layers each having a thickness of approximately 0.0025 inch and a width of 3 inches, a scrim made up of glass fibers having a diameter of about 110 denier, and an adhesive 10 which is applied as a coating having a thickness of approximately 0.002 inch. Preferably amorphous polypropylene is used as the adhesive 10. The encapsulated transponders are the Texas Instruments transponders mentioned hereinabove.

The invention may be practiced in ways or forms other that as described above. Thus, for example, the webs 4 and/or 6 may be made of various materials other than paper, e.g., polyethylene, polypropylene or other polymer materials such as a polyester film. While a reinforced tape as described above is a preferred form of the invention, it is to be understood that the scrim 8 may be omitted where tape strength is not a crucial factor. Also the adhesive 12 need not be water activatable. Instead it may be a pressure sensitive adhesive, in which case, depending on the nature of the materials used for the webs 4 and/or 6, a release layer in the form of an additional web 24 (as represented shown in dotted lines in FIG. 2) may be required to be applied over the adhesive 12 to maintain its active life and to prevent it bonding to adjacent portions of the laminated tape. The release layer may take various forms known to persons skilled in the art. For example, it may be a waxed paper or a plastic film that is adapted to serve as a protective release sheet.

Packaging tapes with RFID technology as provided herein may be used to seal cartons or envelopes (made of cardboard, paper or other materials) that are to be shipped or stored. The invention provides numerous advantages. For one thing, use of tape made according to the invention is of particular value to industries that need to quickly and accurately track and manage very large numbers of packages, e.g., commercial express delivery companies and e-commerce companies. Each transponder chip may be pre-programmed with its own unique ID code at the time of manufacture of the RFID unit, making it impossible to replicate and thus providing additional security. Alternatively each transponder chips may be programmed immediately before or at any time after the section of tape into which it is incorporated it is used to seal a carton or other package. Additional data also may be written into the transponder memory at any selected time. Use of packaging tape incorporating the present invention makes it possible to identify a package accurately and in real time. Also a large volume of packages may be identified without errors regardless of their orientation and even though they may be disposed in a random pile, thus improving on tracking and inventory management, and permitting more precise and prompt deliveries of packages. By way of example, utilizing packaging tape as herein provided makes it possible for a system operator at a base station to program specific data, e.g., delivery checkpoints, pallet assignments, place of origin and/or destination, and other inventory management information into the transponders, without requiring singulization of packages. Essentially the tape incorporating the invention simultaneously seals a package and makes it "intelligent" in the sense that the package now carries information that can be accessed or changed remotely. The invention makes possible time savings when shipping or maintaining inventory in large volumes, particularly since reading date into and out of a tape-encapsulated transponder can be accomplished even if the package is moving, since line of sight interrogation is unnecessary. A base station can serially identify numerous transponders in its antenna field so rapidly that the identifications of a number of packages appear as being almost simultaneous. Another advantage of the invention is that the data collected from the transponder chips can be sent to a host computer through standard interfaces and may be saved for uploading at a later time. Still other advantages of the invention are that the chips are not visible when encapsulated between the paper layers of a packaging tape, and a chip cannot be removed from a packaging tape applied to a carton or other package without its removal being evident. On the other hand. It is possible to make one or more layers of the packaging tape out of a plastic material instead of paper, and such plastic material may be opaque, translucent or transparent to light, depending on whether or not it is desired to make the RFID devices visible to the naked eye.

Other modifications and advantages of the invention will be obvious to persons skilled in the art from the foregoing specification and the drawings.

What is claimed is:

1. A roll of adhesive packaging tape, said tape comprising first and second webs of flexible material bonded to one another along their lengths, a layer of a reinforcing scrim disposed between said webs adjacent said first web, a plurality of RFID transponders disposed between and sealed off by said first and second webs, said transponders being spaced from one another lengthwise of said webs and being disposed between said layer of scrim and said second web, and an adhesive coating on the outer surface of one of said webs, whereby severed sections of said tape, each such severed section including one of said transponders, may be applied to individual packages.

2. A roll of adhesive packaging tape according to claim 1 wherein said first and second webs are made of paper.

* * * * *